United States Patent
Muljono et al.

(10) Patent No.: US 7,069,455 B2
(45) Date of Patent: Jun. 27, 2006

(54) LOW POWER DIFFERENTIAL LINK INTERFACE METHODS AND APPARATUSES

(75) Inventors: Harry Muljono, Union City, CA (US); Stefan Rusu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/611,079

(22) Filed: Jun. 30, 2003

(65) Prior Publication Data

US 2004/0268167 A1    Dec. 30, 2004

(51) Int. Cl.
G06F 1/26 (2006.01)
H03K 3/00 (2006.01)

(52) U.S. Cl. .................. 713/320; 713/323; 327/108

(58) Field of Classification Search ............ 713/300, 713/320, 323; 327/108
See application file for complete search history.

(56) References Cited

U.S. PATENT DOCUMENTS

| | | | |
|---|---|---|---|
| 5,623,286 A * | 4/1997 | Morimoto et al. | 345/212 |
| 5,745,105 A * | 4/1998 | Kim | 345/212 |
| 6,211,719 B1 | 4/2001 | deBrigard | |
| 6,215,339 B1 * | 4/2001 | Hedberg | 327/108 |
| 6,236,231 B1 | 5/2001 | Nguyen et al. | |
| 6,246,262 B1 * | 6/2001 | Morgan et al. | 326/81 |
| 6,294,933 B1 * | 9/2001 | Chun et al. | 326/86 |
| 6,356,260 B1 * | 3/2002 | Montalbo | 345/204 |
| 6,400,598 B1 * | 6/2002 | Nguyen et al. | 365/63 |
| 6,445,730 B1 * | 9/2002 | Greszczuk et al. | 375/219 |
| 6,535,031 B1 * | 3/2003 | Nguyen et al. | 327/65 |
| 6,552,582 B1 * | 4/2003 | Bryan et al. | 327/108 |
| 6,934,870 B1 * | 8/2005 | Amos | 713/501 |
| 6,937,353 B1 * | 8/2005 | Iizuka et al. | 358/1.13 |
| 2004/0259583 A1 * | 12/2004 | Yamada | 455/522 |

* cited by examiner

*Primary Examiner*—Thomas Lee
*Assistant Examiner*—Suresh K Suryawanshi
(74) *Attorney, Agent, or Firm*—Schwabe Williamson & Wyatt (57) ABSTRACT

A driver of a first component and a receiver of a second component of a system are equipped to operate at least one of the driver and the receiver in a low power consumption state, during at least a portion of a quiescent state, when transmitting data from the first to the second component differentially, via a link interface with two lines, coupling the components. The driver and the receiver include respective monitor circuits to detect for the quiescent state, with the driver's monitor circuit monitoring for constancy over a predetermined period, and the receiver's monitor circuit monitoring for zero states on both lines. Further, in one embodiment, the driver's monitor circuit places the driver in the low power consumption state by grounding the two lines.

40 Claims, 7 Drawing Sheets

LOW POWER DIFFERENTIAL LINK INTERFACE METHODS AND APPARATUSES

FIELD OF THE INVENTION

Embodiments of the present invention relate to the fields of data communication. More specifically, embodiments of the present invention are related to a low power differential data communication technique.

BACKGROUND OF THE INVENTION

Ever since the beginning of computing, it has always been necessary to move data from one component of a computing device to another, e.g. from the central processing unit (CPU) to memory, or from memory to a peripheral device. Data may be moved e.g. serially, i.e. one bit after another, over a single transmission line. Alternatively, for larger amount of data, they may be moved in parallel over multiple transmission lines.

However, there is a practical limit to the number of bits that can be moved in parallel at high speed, as the amount of transient noises caused by the rapid on and off switching of a large number of bit lines, at some points, cause sufficient interference to limit the distance the parallel transmission may be made.

To overcome this problem, differential signaling employing two transmission lines for each bit was designed. However, current practice has the disadvantage of continuing to consume power even during the quiescent states, when there are no data being transmitted over. This is especially undesirable for low power high performance application, such as portable computing devices with wide data paths.

Thus, a more power efficient differential signaling technique is desired.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF EMBODIMENTS OF THE INVENTION

Embodiments of the present invention include but are not limited to a signal transmission technique, circuits practicing the technique, and apparatuses endowed with the circuits.

Parts of the description will be presented in terms commonly employed by those skilled in the art to convey the substance of their work to others skilled in the art, such as drivers, receivers, differential signaling, and so forth. These terms are to be accordingly their common meaning as understood by those skilled in the art.

In the following description, various aspects of embodiments of the present invention will be described. However, it will be apparent to those skilled in the art that embodiments of the present invention may be practiced with only some or all aspects of the present invention. For purposes of explanation, specific numbers, materials and configurations are set forth in order to provide a thorough understanding of the described embodiments of the present invention. However, it will be apparent to one skilled in the art that other embodiments may be practiced without the specific details. In other instances, well-known features are omitted or simplified in order not to obscure the described embodiments of the present invention.

Various operations will be described as multiple discrete operations in turn, in a manner that is most helpful in understanding these embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
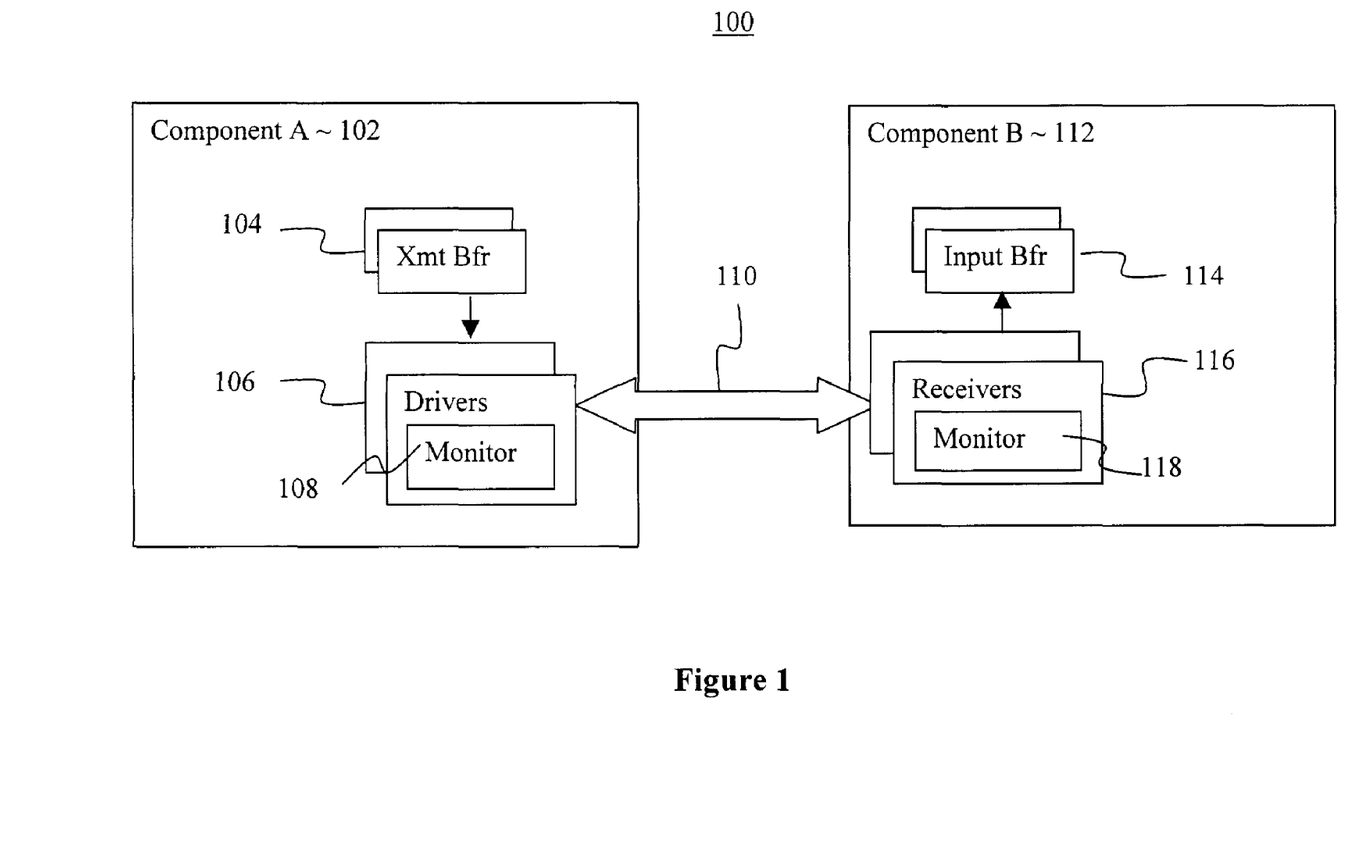
FIG. 1 illustrates a system view of the present invention, in accordance with one embodiment.

Refer now to FIG. 1, wherein an overview of the present invention, in accordance with one embodiment, is shown. As illustrated, for the embodiment, computing device 100 includes component A 102 and component B 112 coupled to each other via link interface 110. Component A 102 includes in particular transmit buffers 104 and drivers 106 having corresponding monitor circuits 108 in accordance with one aspect of the present invention. Component B 112, on the other hand, includes input buffers 114 and receivers 116 having complementary monitor circuits 118 in accordance with one aspect of the present invention. Link interface 110 comprises n pairs of bit lines, to facilitate differential transmission of n bits of data in parallel from component A 102 to component B 112. N is an integer greater than 0, e.g. 16.

As will be described in more detail below, drivers 106 as well as receivers 116 are designed to be able to operate in at least two power consumption levels, a higher power consumption level while data are being transmitted from component A 102 to component B 112, and a lower power consumption level during quiescent states.

Monitor circuits 108 are employed to monitor for the quiescent states, and upon detection, places drivers 106 to operate in the lower power consumption level on occurrences of the quiescent states. Complementarily, monitor circuits 118 are employed to monitor for the fact that drivers 106 are operating at the lower power consumption level. In response, monitor circuits 118 also place receivers 116 to operate at the lower power consumption level.

The "higher" power levels of drivers 106 and receivers 116 may be the same or different. Likewise, the "lower" power levels of drivers 106 and receivers 116 may be the same or different.

Except for the advantageous endowment of drivers 106 and receivers 116 with monitor circuits 108 and 118 respectively, and their employment to facilitate placing drivers 106 and receivers 116 in lower power operation when opportunities, i.e. quiescent states, present themselves, component A 102 and component B 112, including transmit buffers 104 and input buffers 114, represent a broad range of computing device components and constituting buffers known in the art or to be designed.

In various embodiments, computing device 100 may be a palm sized computing device, a tablet computing device, a laptop computer, a desktop computer, a set-top box, an entertainment center, a server, a mass storage array, and so forth. Component A 102 may be a processor, a memory device, a bus controller, a mass storage device, and so forth, and component B 112 may be a memory device, a mass storage device, a printer, a display, and so forth.

In various embodiments, transmit buffers 104 and input buffers 114 are both FIFO. However, in alternate embodiments, they may be storage devices of other types.

While embodiments of the present invention are preferably practiced with both drivers 106 and receivers 108 being endowed to operate in a low power level during the quiescent states, other embodiments may have only either drivers 106 or receivers 108 being endowed to operate in a lower power level during the quiescent states.

Figure 2:
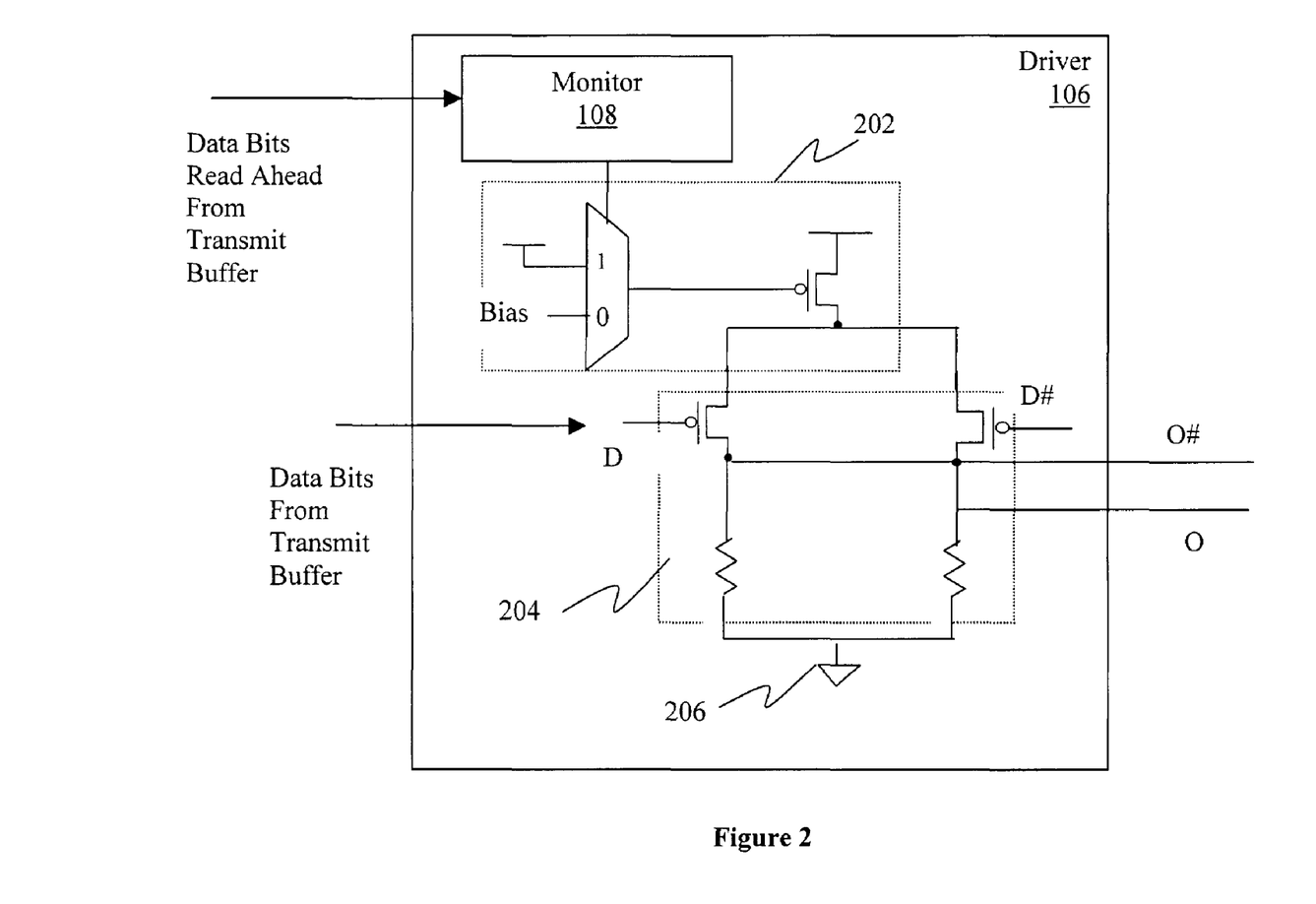
FIG. 2 illustrates the driver of FIG. 1 in further detail, in accordance with one embodiment.

FIG. 2 illustrates one driver 106 in further detail, in accordance with one embodiment. In addition to monitor circuit 108, for the embodiment, the one driver 106 includes output buffer 204 and bias control circuit 202, coupled to each other, transmit buffers 104, transmission bit lines O# and O, and ground 206 as shown.

During operation, monitor circuit 108 looks ahead into the relevant portion of the content of transmit buffer 104 to detect for quiescent states. In one embodiment, monitor circuit 108 monitors for constancy in the relevant portion of the transmit data, e.g. for a contiguous string of at least N zeros, and infers each contiguous string, on occurrence, is a quiescent state. The relevant portion of the transmit data is the corresponding bit portion the particular driver 106 is responsible for transmitting. N is an integer greater than 1.

For the embodiment, on occurrence of each quiescent state, monitor circuit 108 places the driver 106 in the lower power consumption level by turning off bias control circuit 202, causing the corresponding transmission bit lines O# and O to be grounded. In other words, for the embodiment, the corresponding transmission bit lines O# and O are in a zero-zero state, when driver 106 is placed into the low power state.

In various embodiments, N is functionally dependent on, i.e. designed in accordance with, at least the latencies for turning off and on a driver 106, and the latencies for turning off and on a receiver 116. In one embodiment, N further accommodates the employment of a pre-drive cycle to re-start a receiver 116, one of which is illustrated in FIG. 6.

More specifically, in one embodiment, N is calculated as follows:

> N=turn off latency of a driver bias circuit+turn off latency of relevant elements of a receiver+turn on latency of a driver bias circuit+turn on latency of relevant elements of a receiver+1 time period for a pre-drive cycle At the end of a quiescent state, monitor circuit 108 turns its bias control circuit 202 back on, bringing its driver 106 from the low power state of operation back to the normal higher power consuming state of operation. At such time, the corresponding transmission lines O# and O are no longer grounded in the zero-zero state.

Figures 6, 7:
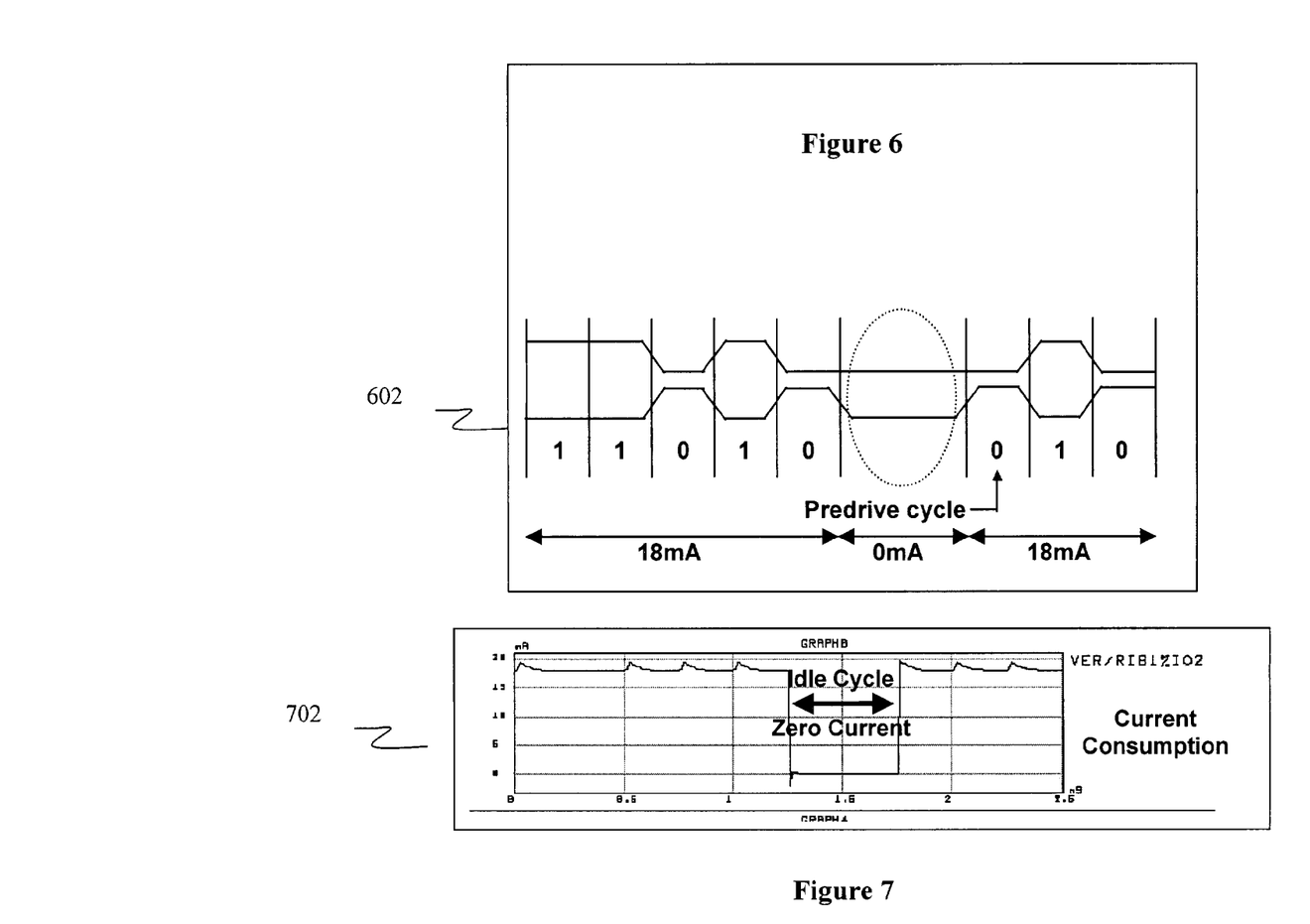
FIG. 6 illustrates an example quiescent state.
FIG. 7 illustrates an improved current consumption profile for an example driver incorporated with teachings of embodiments of the present invention.

FIG. 7 illustrates the resulting current consumption profile for an example driver 106, endowed with the teachings as earlier described. As illustrated, the teachings advantageously result in lower power consumption for the driver, which is particularly desirable for certain power sensitive applications, such as portable computing, especially portable computing with wide data paths.

Except for the endowment of driver 106 with monitor circuit 108, bias control 202, and the ability to ground transmission lines O# and O, and the employment of these elements to operate driver 106 in a low power state, driver 106, including output buffer 204, represents a broad range of drivers known in the art or to be designed.

Figure 3:
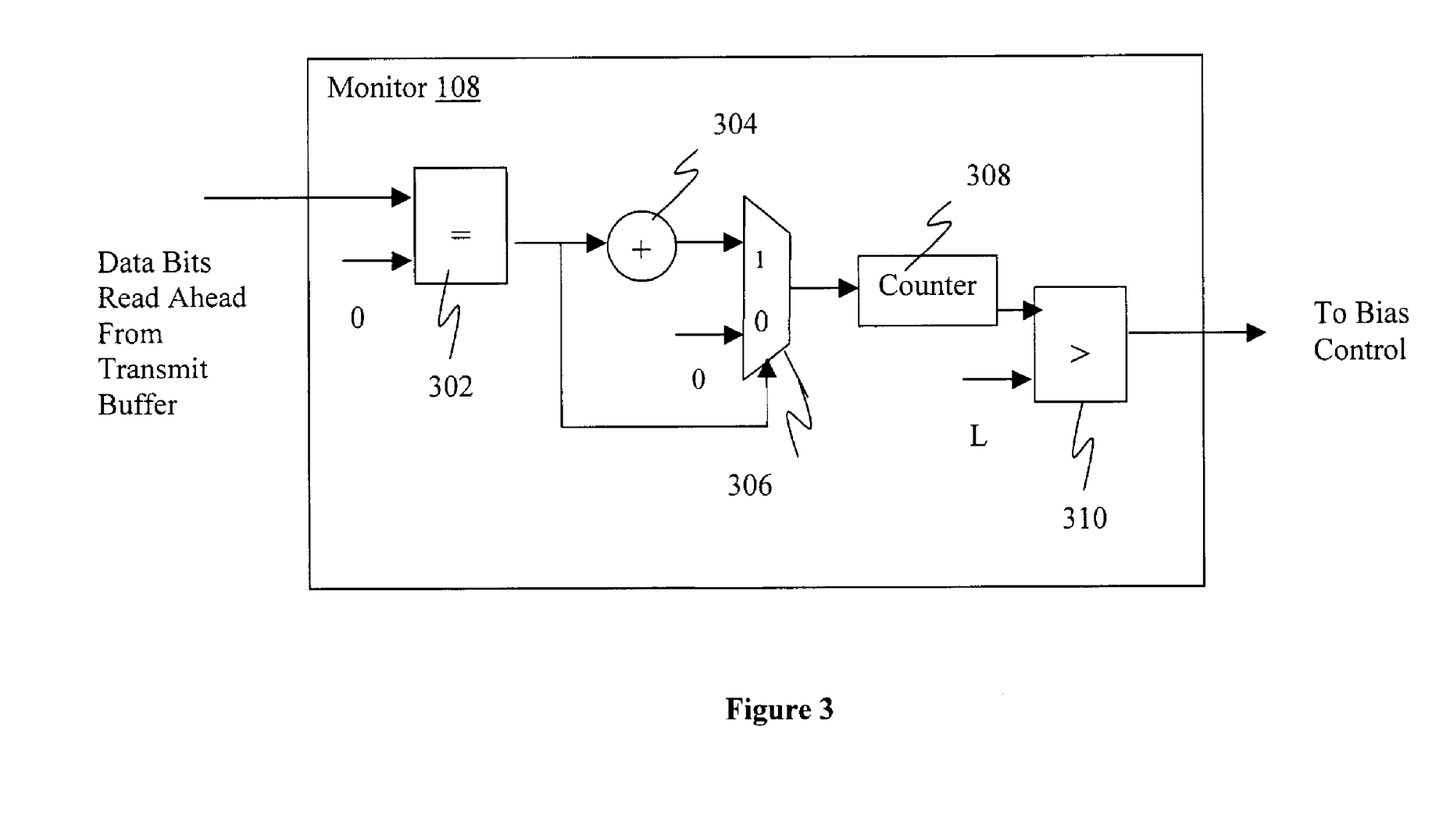
FIG. 3 illustrates the driver monitor circuit in further detail, in accordance with one embodiment.

FIG. 3 illustrates a driver's monitor circuit 108 in further detail, in accordance with one embodiment. For the embodiment, monitor circuit 108 includes two comparators 302 and 310, adder 304, selector 306 and a counter 308, coupled to each other as shown. As illustrated, for the embodiment, as monitor circuit 108 looks ahead into the transmit data staged in transmit buffer 104, each successive bit is compared using comparator 302 to determine if it is a zero. If so, a true value "1" is outputted, else a false value "0" is outputted.

The true/false value is added, using adder 304, to the current value of the accumulated count value 308. The true/false value is also employed to select the incremented count value, when another 0-bit is detected in the transmit data, or zero to reinitialize the count value, when a 1-bit is detected in the transmit data instead.

The current count is examined continuously, using comparator 310, to determine whether the current count has exceeded a predetermined length of constancy (N). If so, an appropriate output to turn off the corresponding bias control circuit 202 is outputted.

Figure 4:
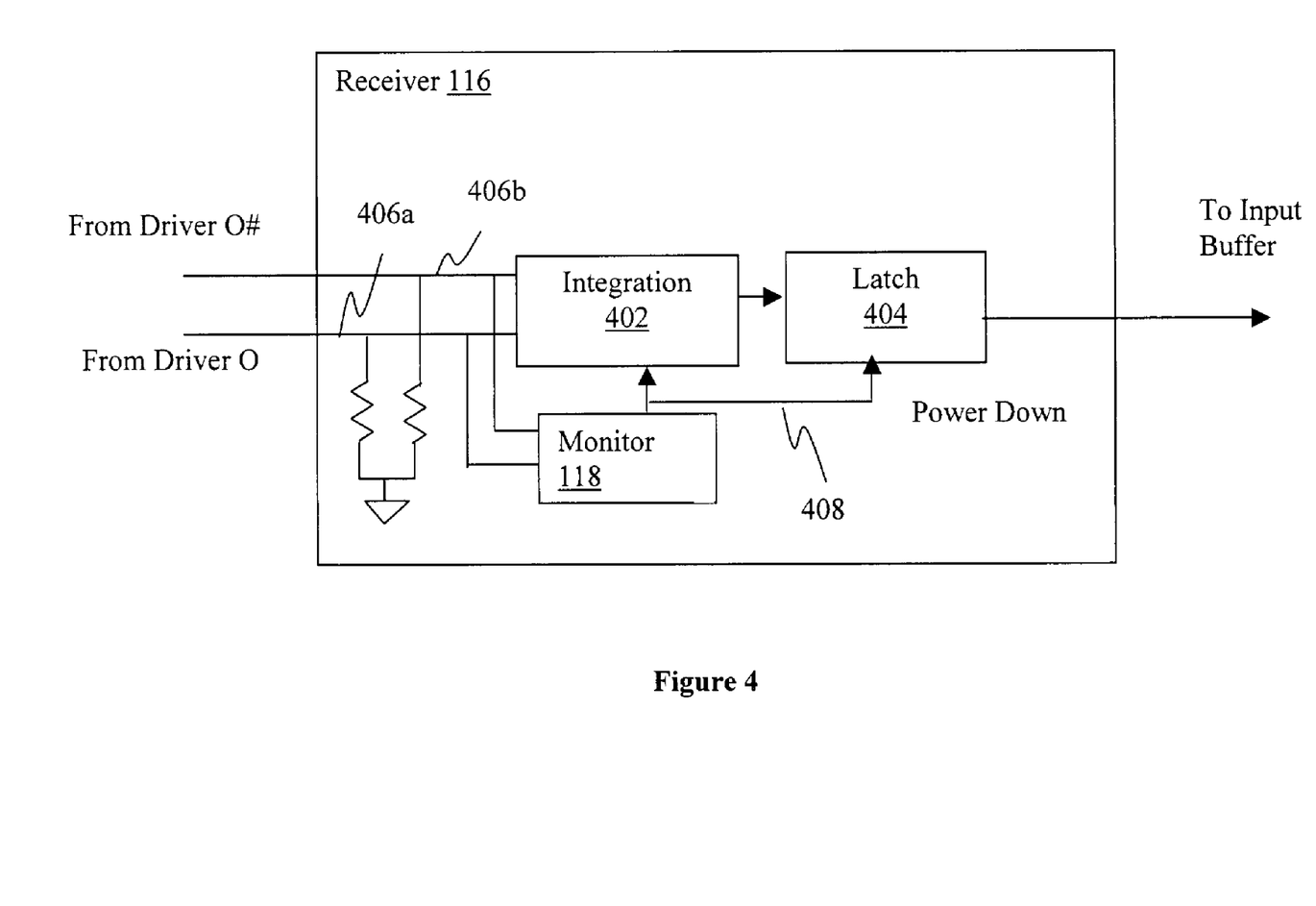
FIG. 4 illustrates the receiver of FIG. 1 in further detail, in accordance with one embodiment.

FIG. 4 illustrates one receiver 116 in further detail, in accordance with one embodiment. As illustrated, for the embodiment, receiver 116, in addition to monitor circuit 118, includes integration unit 402 and latch 404, coupled to each other, transmission bit lines O# and O and input buffer 114, as shown. Transmission bit lines O# and O are also coupled to ground.

In various embodiments, by virtue of the fact that monitor circuits 108 are designed to ground the transmission bit lines O# and O to place drivers 106 to the lower power consumption level of operation, monitor circuit 118 complementarily monitors for a zero-zero state on its pair of transmission bit lines to infer entrance into a quiescent state.

Similarly, on entrance into a quiescent state, monitor circuit 118 turns off integration unit 402, latch 404 and so forth.

Likewise, at the end of a quiescent state, monitor circuit 118 turns integration unit 402, latch 404 and so forth back on.

Except for the endowment of receiver 116 With monitor circuit 118, and its employment to operate receiver 116 in a low power state, receiver 118, including integration unit 402 and latch 404, represents a broad range of receivers known in the art or to be designed.

Figure 5:
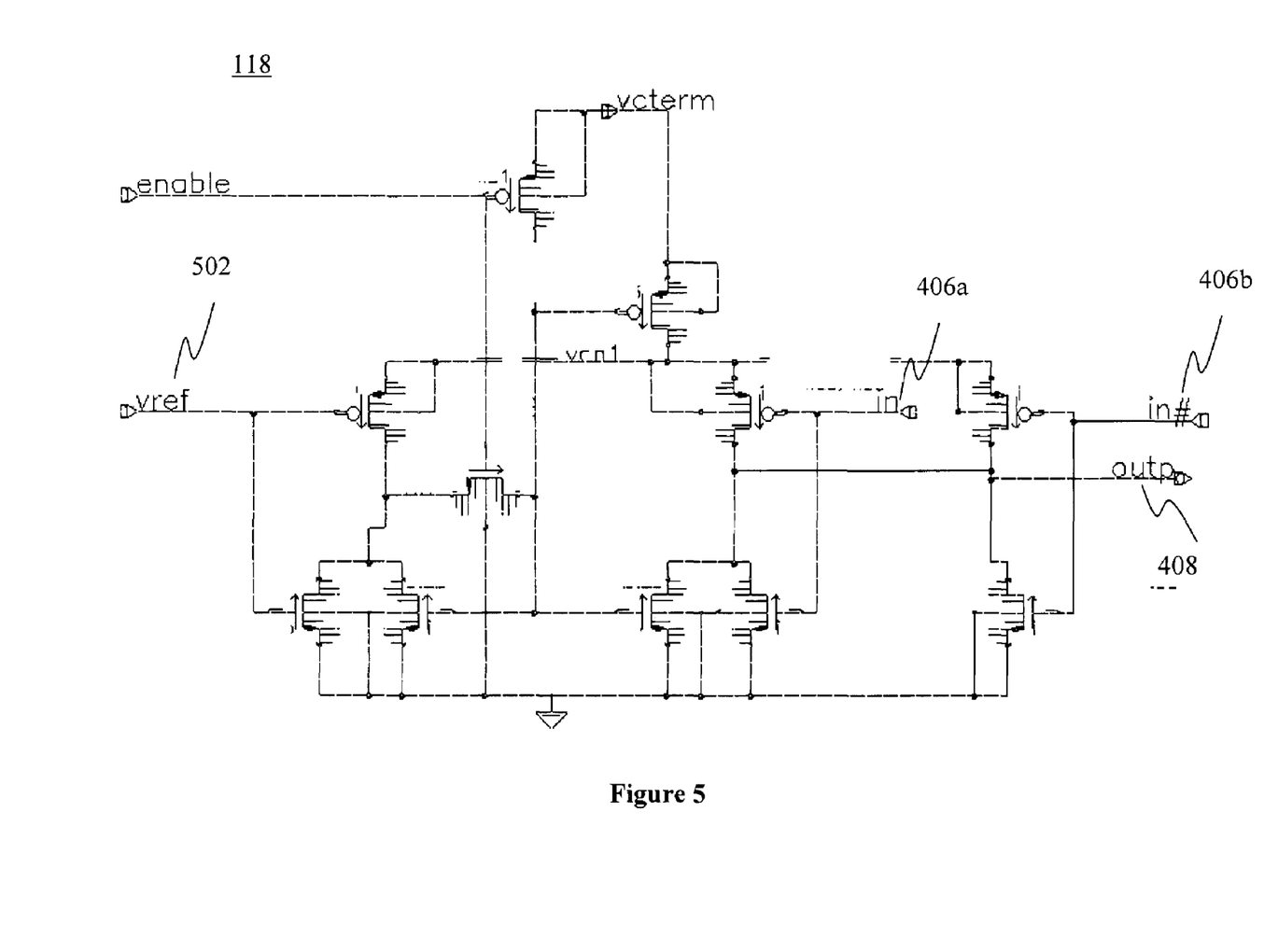
FIG. 5 illustrates the receiver monitor circuit in further detail, in accordance with one embodiment.
Figure 8:
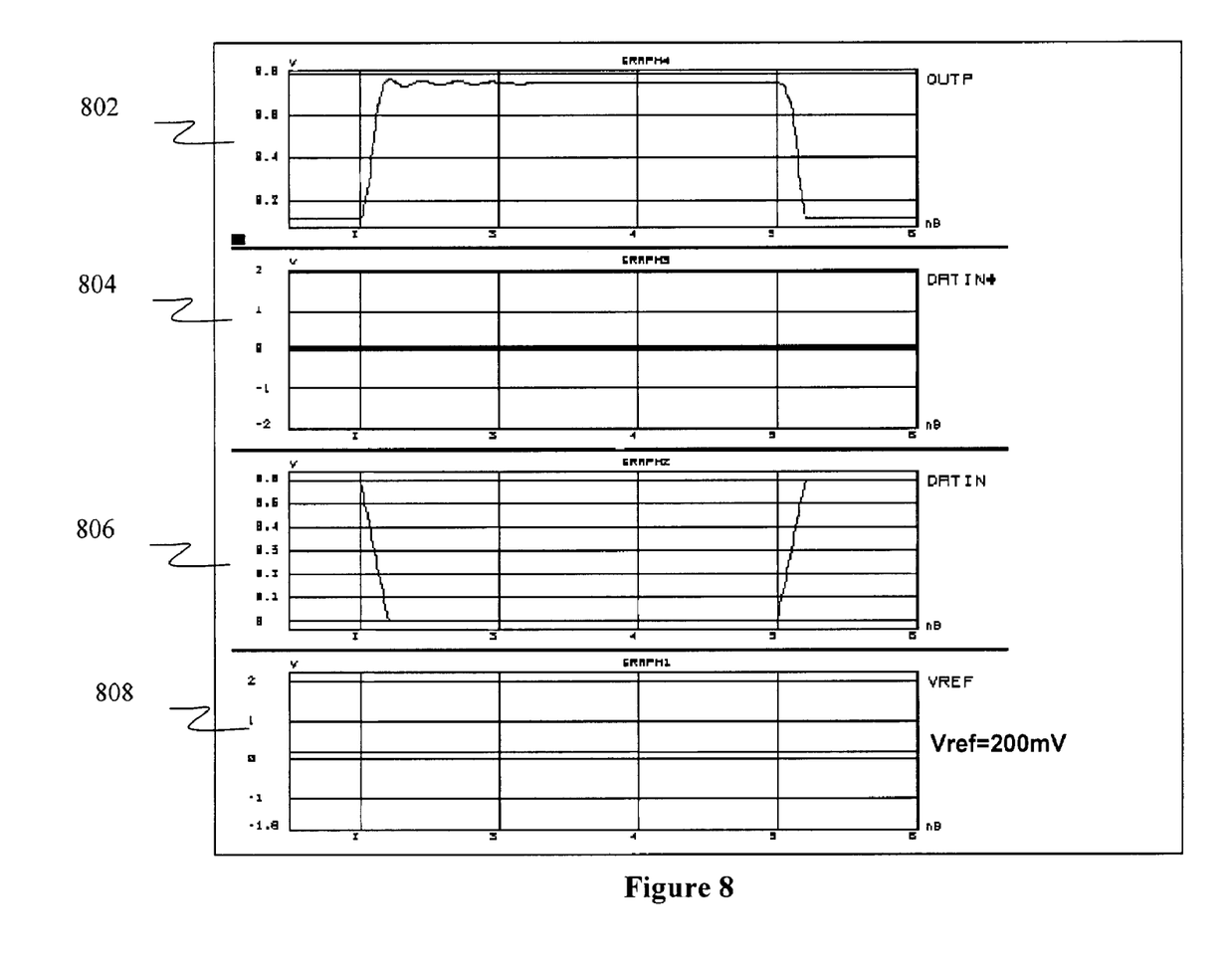
FIG. 8 illustrates the switching characteristics of the receiver monitor circuit, in accordance with one embodiment.

FIG. 5 illustrates a receiver's monitor circuit 118 that detects for a zero-zero state on a pair of transmission bit lines O# and O in further detail, in accordance with one embodiment. For the embodiment, monitor circuit 118 is a 3-input amplifier, including inputs IN and IN# 406a and 406b and reference voltage (Vref). Vref is set at the half swing level, e.g. 200 mv for a 400 mv swing input embodiment. Thus, when IN and IN# go to zeros, output signal OUTP 408 goes high, to turn off the various elements of receiver 116. One example of the described signal switching is illustrated in FIG. 8.

Thus, it can be seen from the above descriptions, a novel technique to differentially signal data in a more power efficient manner has been described.

While embodiments of the present invention have been described in terms of the foregoing embodiments, those skilled in the art will recognize that the invention is not limited to the embodiments described. Alternate embodiments may be practiced with modification and alteration within the spirit and scope of the appended claims.

Thus, the description is to be regarded as illustrative instead of restrictive.

What is claimed is:

1. An apparatus comprising:
   a transmit buffer to store transmit data; and
   a driver coupled to the transmit buffer to output the transmit data onto a link interface having two lines, differentially and at a first power consumption level, including a monitor circuit to detect for quiescent states, and on occurrence of a quiescent state, causes the driver to go from the first power consumption level to a second power consumption level that consumes less power than the first power consumption level, during at least a portion of the quiescent state.

2. The apparatus of claim 1, wherein said monitor circuit is designed to look ahead at the transmit data, and infer a quiescent state in a duration where the transmit data remains unchanged for a predetermined period.

3. The apparatus of claim 2, wherein said predetermined period is functionally dependent on at least a selected one of a first latency to transition the driver from the first power consumption level to the second power consumption level, and a second latency to transition the driver from the second power consumption level to the first power consumption level.

4. The apparatus of claim 2, wherein
   the driver is further coupled to a receiver of another apparatus, the receiver being equipped to likewise go from a third power consumption level to a fourth power consumption level, consuming less power than the third power consumption level, when the transmit data is in the quiescent state; and
   said predetermined period is functionally dependent on at least a selected one of a first latency to transition the receiver from the third power consumption level to the fourth power consumption level, and a second latency to transition the receiver from the third power consumption level to the fourth power consumption level.

5. The apparatus of claim 2, wherein said predetermined period is designed to accommodate at least one pre-drive cycle.

6. The apparatus of claim 1, wherein the monitor circuit is designed to cause the driver to operate at the second power consumption level by grounding the two lines.

7. The apparatus of claim 6, wherein
   the driver comprises an output buffer coupled to ground, and the link interface, and a bias control circuit coupling the output buffer to the monitor circuit; and
   the monitor circuit grounds the two lines by turning off the bias control circuit.

8. The apparatus of claim 1, wherein the monitor circuit is further designed to cause the driver to go from the second power consumption level back to the first power consumption level, to resume receiving and outputting transmit data differentially onto the link interface, at the end of a detected quiescent state.

9. The apparatus of claim 1, wherein the apparatus is a selected one of a microprocessor, a bus controller, and a mass storage controller.

10. In an apparatus, a signal transmission method comprising:
    operating a driver of the apparatus at a first power level to receive transmit data, and output the received transmit data onto a media having two lines differentially;
    monitoring the transmit data to detect for quiescent states; and
    on occurrence of a quiescent state, causing the driver to operate at a second power level, consuming less power than the first power level.

11. The method of claim 10, wherein said monitoring comprises looking ahead at the transmit data, and infer a quiescent state in a duration where the transmit data remains unchanged for a predetermined period.

12. The method of claim 11, wherein said predetermined period is functionally dependent on at least a selected one of a first latency to transition the driver from the first power consumption level to the second power consumption level, and a second latency to transition the driver from the second power consumption level to the first power consumption level.

13. The method of claim 11, wherein
    the driver is coupled to a receiver of another apparatus, the receiver being equipped to likewise go from a third power consumption level to a fourth power consumption level, consuming less power than the third power consumption level, when the transmit data is in the quiescent state; and
    said predetermined period is functionally dependent on at least a selected one of a first latency to transition the receiver from the third power consumption level to the fourth power consumption level, and a second latency to transition the receiver from the third power consumption level to the fourth power consumption level.

14. The method of claim 11, wherein said predetermined period is designed to accommodate at least one pre-drive cycle.

15. The method of claim 10, wherein said operating the driver at the second power consumption level comprises grounding the two lines.

16. The method of claim 15, wherein said grounding of the two lines comprises tuning off a bias control circuit controlling an output buffer coupled to ground and the link interface.

17. The method of claim 10, wherein the method further comprises causing the driver to go from the second power consumption level back to the first power consumption level, to resume receiving and outputting transmit data differentially onto the link interface, at the end of a detected quiescent state.

18. An apparatus comprising:
    an input buffer; and
    a receiver coupled to the input buffer and a link interface having two lines to receive data transmitted differentially and at a first power consumption level, and place the received data into the input buffer, including a monitor circuit to detect for quiescent states, and on detection of a quiescent state, causes the receiver to go from the first power consumption level to a second power consumption level that consumes less power than the first power consumption level, the receiver including an integration and a latch coupled together, the integration coupled to the two lines to receive the data, and the latch coupled to the input buffer.

19. The apparatus of claim 18, wherein said monitor circuit is designed to detect the two lines being both in zero states, and infer a quiescent state in a duration when the two lines are both in zero states.

20. The apparatus of claim 18, wherein said monitor circuit comprises a 3-input differential amplifier.

21. The apparatus of claim 18, wherein said monitor circuit comprises a reference voltage set at a half swing level.

22. The apparatus of claim 18, wherein said monitor circuit is further designed to cause the receiver to go from the second power consumption level back to the first power consumption level to resume receiving data transmitted differentially onto the link interface, and placing the received data on the input buffer, at the end of a detected quiescent state.

23. The apparatus of claim 18, wherein the apparatus is a selected one of a display, a printer, and a mass storage device.

24. In an apparatus, a signal transmission method comprising:
   operating a receiver of the apparatus at a first power level to receive data from a link interface having two lines, over which the data are transmitted differentially, and storing the received data in an input buffer, the receiver includes an integration and a latch coupled together, the integration coupled to the two lines to receive the data, and the latch coupled to the input buffer;
   monitoring for a quiescent states; and
   on detection of a quiescent state, causing the receiver to operate at a second power level, consuming less power than the first power level.

25. The method of claim 24, wherein said monitor circuit is designed to detect the two lines being both in zero states, and infer a quiescent state in a duration when the two lines are both in zero states.

26. The method of claim 24, wherein the method further comprises setting a reference voltage for use to perform said monitoring at a half swing level.

27. The method of claim 24, wherein the method is further designed to cause the receiver to go from the second power consumption level back to the first power consumption level to resume receiving data transmitted differentially onto the link interface, and placing the received data on the input buffer, at the end of a detected quiescent state.

28. A system comprising:
   a first component including a driver to receive and output transmit data onto a link interface having two lines, differentially and at a first power consumption level, with the driver including a first monitor circuit to detect for quiescent states, and on occurrence of a quiescent state, causes the driver to go from the first power consumption level to a second power consumption level that consumes less power than the first power consumption level, during at least a portion of the quiescent state;
   the link interface; and
   a second component including a receiver coupled to the link interface to receive the data, operating at a third power consumption level, and place the received data into an input buffer, including a second monitor circuit to detect for quiescent states, and on detection of a quiescent state, causes the receiver to go from the third power consumption level to a fourth power consumption level that consumes less power than the third power consumption level, the receiver includes an integration and a latch coupled together, the integration coupled to the two lines to receive the data, and the latch coupled to the input buffer.

29. The system of claim 28, wherein said first monitor circuit is designed to look ahead at the transmit data, and infer a quiescent state in a duration where the transmit data remains unchanged for a predetermined period.

30. The system of claim 29, wherein said predetermined period is functionally dependent on at least a selected one of
   a first latency to transition the driver from the first power consumption level to the second power consumption level,
   a second latency to transition the driver from the second power consumption level to the first power consumption level,
   a third latency to transition the receiver from the third power consumption level to the fourth power consumption level, and
   a fourth latency to transition the receiver from the fourth power consumption level to the third power consumption level.

31. The system of claim 29, wherein said predetermined period is designed to accommodate at least one pre-drive cycle.

32. The system of claim 28, wherein the first monitor circuit is designed to cause the driver to operate at the second power consumption level by grounding the two lines.

33. The system of claim 32, wherein
   the driver comprises an output buffer coupled to ground, and the link interface, and a bias control circuit coupling the output buffer to the monitor circuit; and
   the first monitor circuit grounds the two lines by turning off the bias control circuit.

34. The system of claim 28, wherein
   the first monitor circuit is further designed to cause the driver to go from the second power consumption level back to the first power consumption level, to resume receiving and outputting transmit data differentially onto the link interface, at the end of a detected quiescent state; and
   said second monitor circuit is further designed to cause the receiver to go from the second power consumption level back to the third power consumption level to resume receiving data transmitted differentially onto the link interface, and placing the received data on the input buffer, at the end of a detected quiescent state.

35. The system of claim 28, wherein said second monitor circuit is designed to detect the two lines being both in zero states, and infer a quiescent state in a duration when the two lines are both in zero states.

36. The system of claim 28, wherein said second monitor circuit comprises a 3-input differential amplifier.

37. The system of claim 28, wherein said second monitor circuit comprises a reference voltage set at a half swing level.

38. The system of claim 28, wherein said system is a selected one of a tablet computing device, a laptop computing device, a desktop computing device, and a server.

39. The system of claim 28, wherein said system is a selected one of an entertainment center and set-top box.

40. The system of claim 28, wherein said system is a mass storage array.

* * * * *

UNITED STATES PATENT AND TRADEMARK OFFICE
CERTIFICATE OF CORRECTION

PATENT NO. : 7,069,455 B2
APPLICATION NO. : 10/611079
DATED : June 27, 2006
INVENTOR(S) : Muljono et al.

It is certified that error appears in the above-identified patent and that said Letters Patent is hereby corrected as shown below:

In the Drawings:

Fig. 5
Reference numeral 502 should be deleted.

Fig. 6
Reference numeral 602 should be deleted.

Fig. 7
Reference numeral 702 should be deleted.

Fig. 8
Reference numerals 802, 804, 806, 808 should be deleted.

Column 2
Line 45, "...e.g. 16." should read --...e.g. 16.-- (no bolding).

Column 3
Line 18, "...receivers 108..." should read --...receivers 116...--.
Line 21, "...receivers 108..." should read --...receivers 116...--.

Column 4
Line 22, "...count value 308." should read --...count value of the counter 308.--.
Line 54, "...receiver 118,..." should read --...receiver 116,...--

UNITED STATES PATENT AND TRADEMARK OFFICE
CERTIFICATE OF CORRECTION

PATENT NO. : 7,069,455 B2
APPLICATION NO. : 10/611079
DATED : June 27, 2006
INVENTOR(S) : Muljono et al.

It is certified that error appears in the above-identified patent and that said Letters Patent is hereby corrected as shown below:

Column 6
Line 45, "...tuning off..." should read --...turning off...--.

Column 7
Line 29, "...a quiescent states;..." should read --...a quiescent state;...--.

Signed and Sealed this

Twenty-ninth Day of July, 2008

JON W. DUDAS
*Director of the United States Patent and Trademark Office*